United States Patent [19]
Thiel et al.

[11] Patent Number: 5,443,141
[45] Date of Patent: Aug. 22, 1995

[54] PRESSURE-CONTROLLED READJUSTING DEVICE FOR A VEHICLE BRAKE

[75] Inventors: Rudolf Thiel; Andreas Doell, both of Frankfurt am Main; Georg Halasy-Wimmer, Eschborn, all of Germany

[73] Assignee: Alfred Teves GmbH, Germany

[21] Appl. No.: 980,802

[22] PCT Filed: May 15, 1992

[86] PCT No.: PCT/EP92/01075
§ 371 Date: Aug. 4, 1993
§ 102(e) Date: Aug. 4, 1993

[87] PCT Pub. No.: WO93/00527
PCT Pub. Date: Jan. 7, 1993

[30] Foreign Application Priority Data
Jun. 26, 1991 [DE] Germany .................. 41 21 054.9

[51] Int. Cl.⁶ .................................................. F16D 55/02
[52] U.S. Cl. ..................................................... 188/71.9
[58] Field of Search .................. 188/71.9, 72.6, 196 D, 188/196 V, 106 F; 192/111 A

[56] References Cited

U.S. PATENT DOCUMENTS

| | | | |
|---|---|---|---|
| 3,920,103 | 11/1975 | Haraikawa | 188/71.9 |
| 4,784,245 | 11/1988 | Fabbro | 188/71.9 |
| 5,086,884 | 2/1992 | Gordon | 188/71.9 |
| 5,249,646 | 11/1993 | Thiel | 188/71.9 |

FOREIGN PATENT DOCUMENTS

| | | | |
|---|---|---|---|
| 2615404 | 8/1982 | Germany . | |
| 3800734 | 7/1989 | Germany . | |
| 3800735 | 7/1989 | Germany . | |
| 3802014 | 7/1989 | Germany : | 188/71.4 |
| 3803564 | 8/1989 | Germany . | |
| 3943106 | 7/1991 | Germany | 188/71.9 |

*Primary Examiner*—Robert J. Oberleitner
*Assistant Examiner*—Clifford T. Bartz
*Attorney, Agent, or Firm*—Ratner & Prestia

[57] ABSTRACT

A readjusting device wherein the readjusting process is pressure-controlled and is readjusted upon a decreasing brake pressure.

The frictional cone is placed in the piston and the sealant is provided between the rotatable readjusting member and the interior wall of the piston. Advantageous embodiments of the readjusting control are disclosed which employ a differential pressure process and improvements in the restoring pattern of the adjusting device.

27 Claims, 8 Drawing Sheets

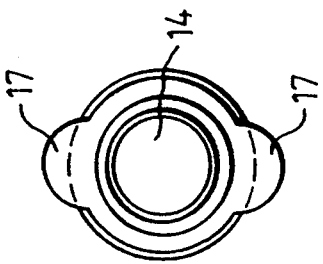
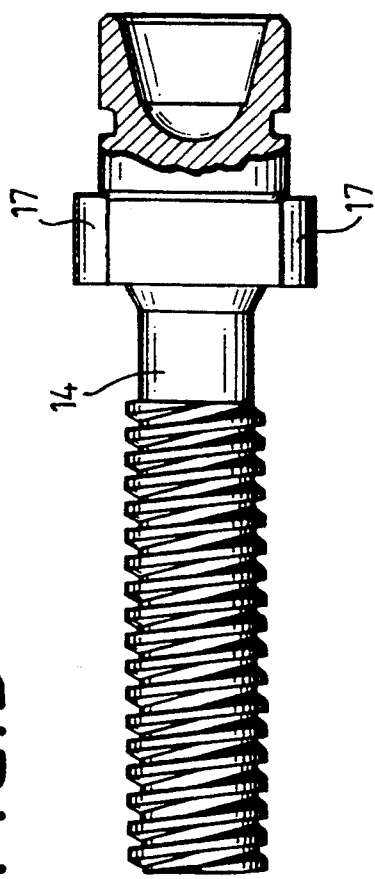
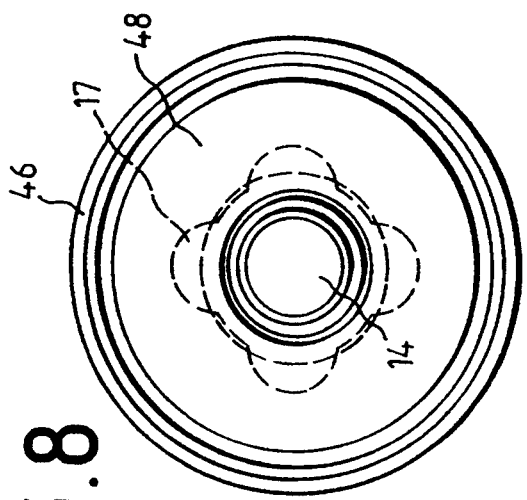
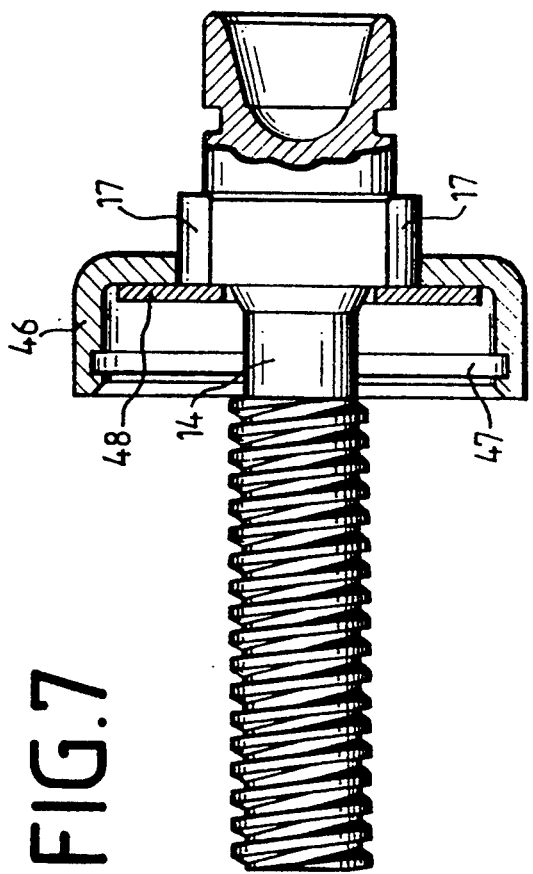

PRESSURE-CONTROLLED READJUSTING DEVICE FOR A VEHICLE BRAKE

BACKGROUND OF THE INVENTION

The present invention is concerned with a pressure controlled readjusting device for a vehicle brake, in particular, a disc brake.

Readjusting devices of the afore-described type are needed in brake calipers intended to perform, in addition to the hydraulic function of the operating brake, the function of a mechanical parking brake. The brake pad wear is compensated by a readjusting device as the operating distance of the mechanical parking brake would otherwise increase by the amount of the pad wear. During operation of such a readjusting device, the brake must be prevented from automatically readjusting by an excessive amount, i.e., the operating clearance between brake pad and brake disc must be maintained. The pad compression and the caliper expansion at elevated hydraulic pressures also must be compensated. Moreover, the readjusting device must be insensitive to high hydraulic pressure and pressure fluctuations, temperature influences, and vibration and must insure operating safety throughout an extended period of time.

To prevent the readjusting device from readjusting at a high brake pressure and, hence, at a resilient deformation of the caliper and of the pad, measures have already been suggested (see German Patents No. 38 00 734, No. 38 00 735, and No. 38 03 564) which prevent adjustment above a predetermined brake pressure. Devices of this type are of a relatively complex design and require a very careful setting of the components involved in switching off the readjusting device. These prior art readjusting devices are limited in that pad wear resulting from a high brake pressure be readjusted during the braking operation.

German Patent No. 26 15 404 teaches switching off the readjusting device at a relatively low pressure and, subsequently, at a decreasing pressure, readjusting the distance no longer covered by the piston because the pad has worn. The disadvantage of the state-of-the-art readjusting device is that it requires a cylinder of a substantially complex design composed of a plurality of individual components. The friction cone of the rotating readjusting device undercuts a part of the cylinder so that the cylinder must be substantially dissembled for repairing or replacing individual components. This problem applies especially to the replacement of the sealant required for initiating the pressure control.

U.S. Pat. No. 3,920,103 displaceably arranges the rotatable readjusting element within the piston in a spring-loaded manner. A sealant is provided on the rotatable element to seal the pad-sided piston cavity against the remaining space of the brake cylinder. However, the readjusting device described therein is of a design such that the spring loading of the rotatable readjusting member tends to keep the friction cone disengaged permanently, resulting, with respect to the hand brake, in comparatively extended readjusting distances.

SUMMARY OF THE INVENTION

It is the object of the present invention, therefore, to provide a readjusting device of the aforedescribed type having a simple and low-cost design, involving comparatively small space requirements, and being able to reliably adjust the necessary amount to assure proper clearance.

The present invention locates, in the readjusting device, the friction cone of the rotatable readjusting member in the piston. At the same time, the rotatable readjusting member is prestressed, through the non-rotating readjusting member, toward the auxiliary actuator. Consequently, the comparatively strong first spring can be displaced into the area of the auxiliary actuator, where relatively ample space is available.

According to one embodiment of the present invention, a second spring, supported on the piston, acts upon the rotatable readjusting member toward the pressure applied to the sealant upon actuation of the brake. That feature assures that, upon commencement of the hydraulic braking operation, the friction cone is safely closed and readjustment in the closing direction of the friction cone, also in a decreased brake pressure, is reliably executed against the existing mechanical friction. Through this feature, the rotatable readjusting member is prestressed toward the friction cone, thereby enabling friction losses, if any, likely to impede readjustment following the braking operation, to be overcome. The spring force will act in the same direction as the sealant to which the brake pressure is applied.

A particularly simple design of the readjusting device is attained when the sealant is configured as a sleeve. Such a configuration allows the second spring to directly engage the sealing sleeve and act upon the rotatable readjusting member, so that intermediate rings or the like are unnecessary.

A particularly favorable enhancement of the on/off effect of the readjusting device caused by the pressure is attained when the rotatable readjusting member protrudes into the interior of the piston and the chamber formed between the closed piston end and the sealant communicates with the atmosphere through a hole within the piston. In such a design, the area of the piston interior behind the sealant is brought to atmospheric (ambient) pressure, thereby enhancing the effect of the brake pressure on the sealant so that the friction cone is safely held closed even at very low brake pressures. This prevents readjustment during the pressure build-up until the pressure is finally decreased.

The rotatable readjusting member is rendered rotatable with respect to the piston by supporting the sealant on the piston and locating a roller bearing between the sealant and the readjusting member acting in the axial direction. This embodiment of the present invention substantially improves the rotating movement of the rotatable readjusting member, thereby further decreasing the potential friction values and enhancing the precision of the readjusting pattern of the readjusting device.

If the rotatable readjusting member is made of a soft material suitable for extrusion processes, the roller bearing is configured as a ball bearing or, preferably, as a needle bearing and a support plate is provided between the roller bearing and the sealant.

To prevent the anti-friction bearing from sliding on the material of the sealant, a support disc is inserted between the bearing and sealant.

The end of the second spring can be locked in a retaining groove within the cylindrical surface of the piston. This embodiment of the present invention provides for a particularly low-cost locking device on the piston. Moreover, the embodiment provides a safety device which, upon disengaging the second spring, will permit a braking movement of the piston even if such braking would otherwise be impossible in view of the limited spring deflection.

According to still another embodiment of the present invention, the rotatable readjusting member is formed as a nut having an internal thread with a conical shoulder at the end facing the piston bottom. A corresponding frictional cone, incorporated into the piston bottom, is associated with the shoulder. This particularly simple design makes good use of the available construction length. Moreover, the nut, because its diameter exceeds that of the spindle, is particularly suitable for accommodating the friction cone; in that instance, larger diameters of the cone and, hence, an enhanced friction effect, are easily attainable.

In a further embodiment of the inventon, the nut has a continuous, longitudinal orifice which permits a low-cost manufacture of the internal thread. The nut is preformed by extrusion and an internal thread can be easily molded into the orifice for accommodating a spindle.

The end of the orifice in the nut facing the piston bottom is sealed, in a pressure-tight manner, by forcing a ball into that end. To the extent that the part provided behind the sealant in the interior of the piston is under ambient pressure, this embodiment of the invention isolates the brake pressure away from the pressure-free space within the piston.

According to another embodiment of the present invention, the hole within the piston is a bore emerging from an annular groove provided within the outer cylindrical surface of the piston. The hole serves to mount the protective sleeve and extends in a direction oblique to the longitudinal axis fo the piston. This embodiment seals the pressure-free interior of the piston against the ingress of dirt and the hole at a large distance from the heated brake plate.

The first spring is supported on the cylinder through a spring cup and can be locked in position by causing the mount of the first spring to engage the housing. The spring cup has, at its open end, a radially outwardly directed rim and slots extending in the longitudinal direction. The locking arms, which are formed by the rim and slots, extend in a direction oblique to the longitudinal axis of the cup.

The non-rotatable readjusting member, as a rule, is locked against rotation by a lug of that member which protrudes into a corresponding groove in the cylinder incorporated into the brake housing. According to another embodiment of the present invention, a mounting socket open toward the spring cup is provided. The spring cup, first spring, and non-rotating spindle are disposed in the mounting socket to form a pre-mounted unit. The mounting socket is held in the cylinder in a non-rotating manner.

It is important that the friction of the rotatable readjusting device be as low as possible. At the same time, a sound sealing effect must be achieved even at a low brake pressure. Consequently, a centering sleeve is provided to improve the orientation of the sealing sleeve between the second spring and the sealant. That design allows the sealing faces of the sealing sleeve to abut the counter faces with minimal friction.

An additional decrease in friction losses can be attained by providing at least one of the sealing faces of the sealant with a sliding material. This embodiment makes it possible to use a wider sliding ring in abutment with one or both sealing faces.

A plurality of narrow sliding rings in parallel with one another can be buttoned to one sealing face or to both sealing faces. The sliding ring, preferably, may be provided only on the sliding face in abutment with the rotatable readjusting member. Alternatively, the sliding ring can be deleted entirely so that, in a non-pressurized condition, a cavity is formed. The cavity is sealed by the sealing lip and friction resistance to the rotatable readjusting member is avoided except for the abutting sealing lip.

To facilitate easy assembly, however, it is also possible for internal and external sliding rings to be interconnected through bridges.

According to another embodiment of the present invention, the non-rotating readjusting member is a spindle held in the cylinder. The spindle is preferably manufactured by extrusion, does not rotate, and is subject to longitudinal displacement.

The invention, in particular, provides external access to the non-pressurized interior of the piston with no escape of brake fluid. Hence, through a corresponding opening, there is access to the rotatable readjusting member so that the readjusted piston can be more easily restored during replacement of the brake pads. The piston has a continuous front opening aligned with the longitudinal axis of the piston. The rotating readjusting member has a recess, which accommodates a threaded tool, aligned with the front opening. The recess is molded either into the rotatable readjusting member or into a closure member.

Importantly, the front opening also vents the pressure-free interior of the piston, thereby avoiding the need for a special hole of the type discussed above. The clearance between the closure member and the front opening prevents friction between the rotatable readjusting member and the piston face and enables the readjusting member to be guided.

The front opening is closed by a lid, which may be detached, or by a detachable pin which protrudes into the recess. The sealant permits access between the interior of the piston and the atmosphere. These features provide an improved mounting surface for the piston on the carrier plate of the brake pad.

The support of the second spring may be modified over that described above. The second spring is placed within a piston sleeve forced into the piston orifice and the roller bearing is supported toward the open side of the piston. The piston sleeve is longitudinally displaced with respect to the inner wall of the piston once a predetermined force is applied. Such a construction enables the force at which the support of the second spring on the piston interior is overcome to be better fixed and readjusted.

It should be noted that the second spring is not required. The effect of the spring can be replaced by the effect of the brake pressure on the sealant. Hence, it is not necessary for the rotatable readjusting member to be readjusted by the second spring; the low pressure which exists during the decrease of the brake pressure will be adequate to unload the first spring, thereby providing a minor gap in the friction cone which is readjusted by the remainder of the brake pressure. In this manner, another simplification of the readjusting device according to the present invention is possible: the second spring is deleted.

The roller bearing can also be supported, on one side, on the piston sleeve through the second spring and in the direction facing away from the piston bottom. On the opposite side, the roller bearing can be supported on the rotatable readjusting member through a racer for the ball bearing or through a support ring and the sealant. That construction provides a clear cut and simple embodiment for the rear face of the sealant.

BRIEF DESCRIPTION OF THE DRAWING

Several embodiments of the present invention will now be described, along with a number of modifications, with reference to the drawing, wherein:

FIGS. 5 and 6 show a readjusting spindle employed in the illustration according to FIG. 13;

FIGS. 7 and 8 show a readjusting spindle disposed in a mounting socket;

DETAILED DESCRIPTION OF THE INVENTION

Figure 1:
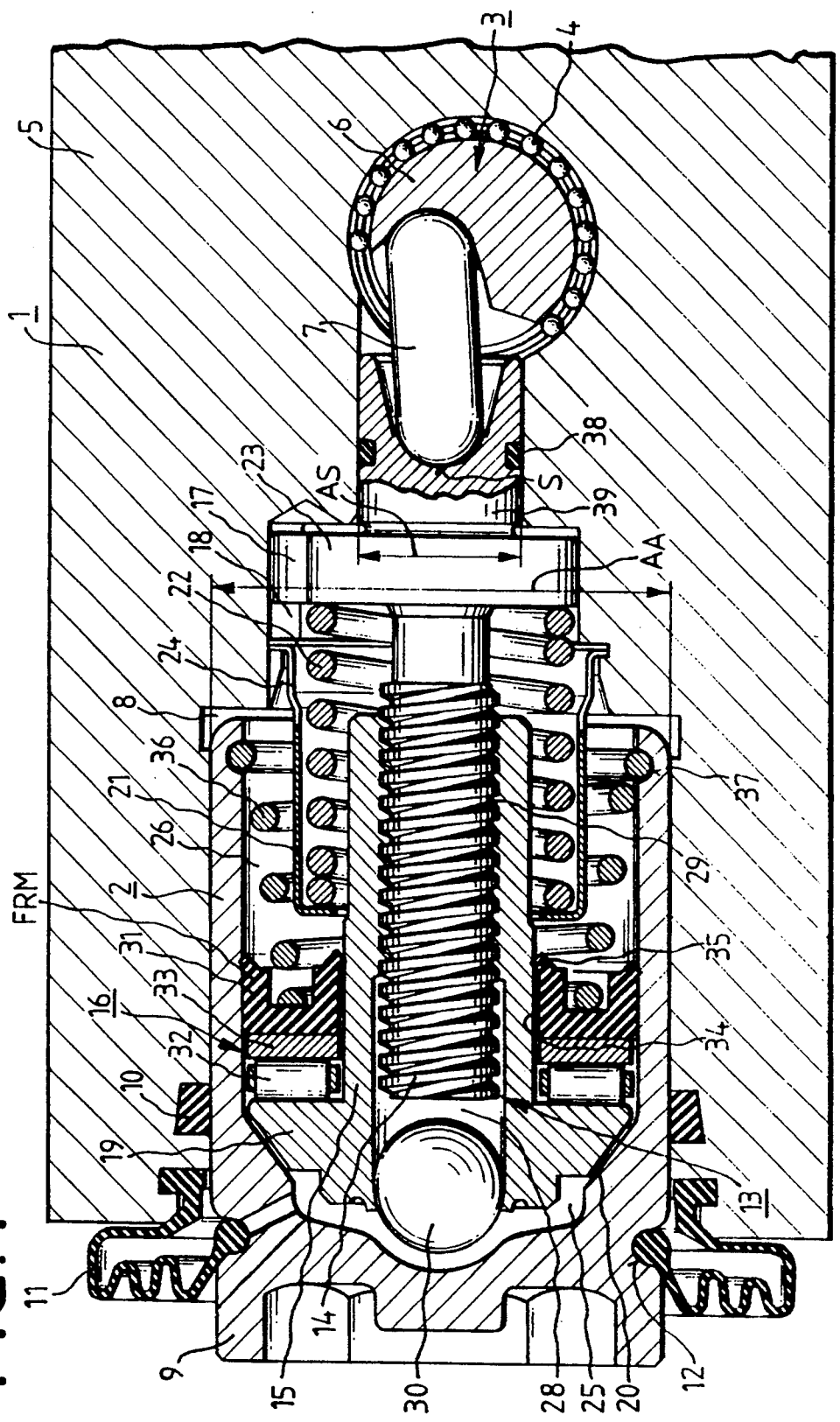
FIG. 1 is a sectional view of a simplified form of one embodiment of the readjusting device according to the present invention.

FIG. 1 shows an actuator 1 for a disc brake provided with a hydraulic actuator 2 and a mechanical actuator 3. The mechanical actuator comprises an actuating shaft 6 rotatably disposed by anti-friction bearings 4 within a brake housing 5. The rotation of the actuating shaft 6 causes a push member 7 to be displaced in a substantially axial direction.

The hydraulic actuating means 2 comprises a step cylinder 8 incorporated into the brake housing 5. A piston 9 is axially displaced within the step cylinder 8 in view of the brake pressure exerted. The piston 9 is sealed against the cylinder 8 by a cylinder sealant 10 which exerts the conventional roll-back effect for restoring the piston 9 after the braking operation. The ends of a dirt-collecting sleeve 11 are held in an annular groove 12 of the piston 9 and within a corresponding groove in the brake housing 5.

The force transmission between the mechanical actuator 3 and the piston 9 is effected through a readjusting device 13. Readjusting device 13 automatically readjusts its length to the position of the piston 9 within the cylinder 8, which varies with pad wear, thereby minimizing the distance for the mechanical actuator 3.

The readjusting device 13, basically, is composed of a spindle 14, forming the non-rotatable readjusting member, and a nut 15, forming the rotatable readjusting member.

The nut, through a sealing unit 16 (described below in greater detail), is sealed against the inner cylindrical surface of the hollow piston 9 and is rotatably disposed. The spindle 14, by a radially extending lug 17 engaging a locking groove 18 within the brake housing 5 or by other measures described below, is locked against rotation but is axially displaceable. A conical lug 19 on the nut 15 forms a friction surface which, together with a corresponding friction surface, forms a friction cone 20 on the bottom of the piston 9 through which the rotating movement of the nut 15 is locked against the piston in a pressure-controlled manner, thereby allowing the rotating movement to be nearly stopped.

One end of a first spring 22 is supported through a spring cup 21 engaging a corresponding circumferential groove within the cylinder 8 of the housing 5. Through a collar 23 of the spindle 14, first spring 22 tends to force the collar 23 against the push member 7. The spring cup 21, at its open end has circumferentially distributed slots 24 confining locking arms formed thereby, through which the cup can be locked into a corresponding groove within the housing 5.

It is of utmost importance to the function of the readjusting device according to the present invention that the interior of the piston 9, through the sealing unit 16, be subdivided into two parts. As shown in FIG. 1, the left-hand part forms an ambient pressure chamber 25. Through a hole 26, pressure chamber 25 is in communication with the environment of the piston 9. In this manner, the effect of the brake force which controls the friction cone and, hence, the rotation of the nut, is enhanced in the hole (or brake pressure chamber) 26 as it no longer works against the remainder of the pressure in the chamber 25 but rather against the atmospheric pressure.

The nut 15, preferably, is configured as an extruded part and is provided with an orifice 28 molded into which is the nut thread 29. This insures a relatively low-cost manufacture of the nut 15. In the event that the hole 26 is provided, it will be necessary for the orifice 28 to be sealed in a pressure-tight manner in order to separate the chambers 25 and 26 in a pressure-tight manner. This, preferably, is effected by a sealing ball 30 forced into the orifice 28.

As to the effect of the sealing unit 16, it is desired that, on the one hand, the nut 15 rotates, friction-free, vis-à-vis the inner face of the piston and, on the other hand, even at a very low brake pressure, a full sealing of the chamber 25 against the chamber 26 is attained. Hence, a low friction is insured during rotation of the sealing unit vis-à-vis the nut and, optionally, vis-à-vis the interior wall of the piston while, at the same time, even at a very low brake pressure, the sealant should respond and seal reliably.

This is achieved, in the embodiment according to FIG. 1, by a sleeve sealant 31 and an anti-friction bearing 32 designed as a needle bearing, with an annular support disc 33 inserted between the sleeve sealant 31 and the anti-friction bearing 32. By substituting a needle bearing 32 for a ball bearing and by providing the support disc ahead of the sleeve sealant and behind the bearing, the force exerted on the sleeve sealant and the conical lug 19 through the substantial brake pressure is reduced. The operation of the sealing unit 16 is thereby assured.

The operation of the sleeve sealant 31 can be further enhanced by inserting a sliding ring 34 at least on the sealing face adjacent the nut 15. Alternatively, the corresponding chamber may be formed through a separating joint so that, substantially, only the sealing lip 35 abuts the nut. Consequently, the friction is considerably reduced as nut 15 substantially rotates away from underneath the sleeve sealant 31 and essentially does not exert any movement vis-à-vis the inner wall of the piston, thereby causing the friction losses to considerably decrease in view of the greater distance.

The sealing unit 16, through a second spring 36, supported on the piston 9, is slightly prestressed against the conical lug 19. Although second spring 36 facilitates operation of the readjusting device according to the invention, it is not absolutely necessary. The end of the second spring 36 disposed toward the open piston side is locked within a retaining groove 37 provided in piston 9. In case of danger, unlocked from the retaining groove 37 once the compressive force acting upon the second spring becomes excessive. Thus, it is insured that, given the readjustment effect, the movement of the piston due to the brake pressure and, hence, the braking operation, can never be seriously impeded.

Shaft 39 of spindle 14, through a sealant 38, is sealed to create a force exerted by the brake pressure on the cross sectional face AS of shaft 39 tending to readjust the spindle 14 toward the push member 7.

The operation of the readjusting device according to the invention will now be described with reference to FIG. 1.

After assembly of the brake, the initial situation is as follows: the friction cone 20 between the nut 15 and the friction face of piston 9 is closed. The shaft 39 of the spindle 14 is in abutment with the push member 7. Provided between the pad (not shown in FIG. 1) before the piston 9 and the brake disc is a clearance. A pad readjusting measurement is required to provide the space needed for assembly of the brake. Subsequently, the piston, by one movement or by a small number of movements, after assembly of the brake, is restored to its initial position. The piston along with the pad, through a hydraulic pressure increase, moves toward the brake disc (not shown), thereby overcoming the pad adjusting measurement and, hence, readjusting the differential distance, optionally, in one movement.

Starting from the afore-described initial position, during the hydraulic actuation, the following operations take part with no pad wear: The friction cone 20 is closed by the effect of the second spring 36. If the readjusting device according to the invention is not provided with a second spring 36, then, in the initial position (at least after the brake has been previously applied), the friction cone 20 will be closed. Friction cone 20 is closed by the remaining pressure, upon termination of the braking operation, and by the restoring effect of the cylindrical sealant 10, which place the conical lug 19 against the friction face of the piston 9. Ambient pressure (differential pressure principle) prevails in the ambient pressure chamber 25. The rising hydraulic brake pressure is exerted on a differential face $A_d$ being the difference between the piston face $A_A$ and $A_S$.

The rising brake pressure and the force of second spring 36 will cause engagement of friction cone 20, thereby preventing rotation of the nut 15 and, hence, readjustment.

Once the brake pressure has reached an adequate value, the piston along with the nut 15 forced against the interior of the piston in FIG. 1, are moved to the left against the pad and the brake disc. Because the friction cone 20 prevents the nut 15 from rotating, nut 15 will pull, through the thread 29, after the clearance has been overcome, the spindle 14 locked against rotation, to the left. This will compress the first spring 22 held on the housing 5. The shaft 39 of the spindle 14 is lifted from the mechanical actuator 3, creating a corresponding gap between the push member 7 and the associated end of the spindle 14. The gap occurs at point S and is not shown in FIG. 1. Because all rotatable parts are now locked against rotation, under a growing hydraulic pressure, regardless of the magnitude of that pressure, no readjustment can be effected; readjustment would require the rotation of nut 15. This will apply upon caliper deformation, pad compression, or other flexible deformation resulting only in a corresponding enlargement of the gap S. The gap simulates a memory function for the distance covered by piston 9 in FIG. 1 to the left but not readjusted yet.

During the pressure decrease, the brake caliper expands and the piston 9 is withdrawn through the cylindrical sealant 10 into its initial position. A further movement of the piston to the right is not possible, because the cylinder sealant cannot return beyond the previous movement of the piston from its initial position to the left. Under the criterion that no pad wear occurred, the spindle will again abut the mechanical actuator 3 because the return movement of the piston completely closed the previously formed gap. The position of the mechanical actuator compared to the position of the spindle 14, hence, simulates a memory function regarding the distance to be readjusted at that moment. The actual readjustment will be effected only when the gap exists after the pressure decrease, indicating that the return movement of the piston 9 has not completely restored it to its initial position. Then—as described below—the readjusting device is readjusted by the force of the springs.

Now, the operation of the readjusting device according to the invention when pad wear occurs will be considered. The processes which occur are compared to the one-movement adjustment.

During the pressure increase, the same operations occur as the ones described above. However, in view of the pad wear or the pad readjusting measurement required for the assembly of the brake, the piston travel exceeds the maximum return travel due to the roll-back effect of the cylinder sealant 10.

During the pressure decrease, the roll-back pattern of the cylindrical sealing ring 10, therefore, is not adequate to place the piston 9 in its initial position held before the pressure build-up. A remaining gap S (e.g., $S_x$) is left between spindle 14 and the mechanical actuator 3, especially the push member 7. In the non-pressurized condition of the brake pressure chamber 26, the retracting force of the first spring 22 now exceeds the oppositely directed cone-closing force of the second spring 36 serving to close the cone, including the sleeve friction force FRM and the friction force of the thread 29. Consequently, the first spring 22 forces the spindle 14 to the right until the gap S is closed toward the mechanical actuator 3 (with $S_X=0$).

The spindle 14 moving to the right, through thread 29, pulls nut 15, thereby disengaging friction cone 20 so that the nut can rotate on the thread 29. The second spring 36, by overcoming the sleeve friction force (including the thread friction force), through the sealing unit 16, is forced against the conical lug 19 of the nut 15, thereby causing the nut to rotate. The nut rotates until the friction force in the friction cone 20 has increased to such an extent that a further rotation is prevented. This will terminate the readjustment and restore the initial situation for the succeeding braking operation.

Now, the operations occurring with the mechanical application of the brake (parking brake) will be described. By rotating the actuating shaft 6, the push member 7 is forced onto the shaft 39 of the spindle 14, with the spindle, in FIG. 1, being moved to the left until the clearance of the thread 29 has been closed. The spindle 14 is forced onto the nut 15, thereby forcing the conical lug 19 against the friction face of the piston 9. The friction cone 20, already initially closed (as described above) is sealed even more firmly. Further movement of the spindle 14 to the left will exert pressure on the piston, thereby moving the piston in the same direction against the pad and brake disc. The thread driving torque, tending to rotate the nut in view of the force exerted on the spindle, will be overcome by the friction torque of the friction cone 20, i.e. the nut is unable to rotate despite the clamping force of the mechanical actuator 3. Hence, no adjustment will be possible. During the mechanical brake actuation, the first spring 22 will be compressed by the spindle movement.

Upon termination of the mechanical actuation, i.e., once the parking brake is released, the actuator 3 will return. Due to the roll-back effect of the cylindrical sealant 10, the piston will be withdrawn. The first spring 22 pulls the spindle 14 to the right. The friction cone 20, due to the friction force of the sleeve sealant 31 and the effect of the second spring 36, will remain closed, i.e., the nut 15 is unable to rotate. The first spring 22 overcomes the thread clearance until the spindle returns to its end position, restoring the initial position existing before the mechanical actuation. However, the thread play must exceed the aggregate of venting clearance, pad compression, and caliper expansion.

A number of advantageous modifications of the adjusting device according to the invention will now be described with reference to FIGS. 2 to 18.

Figure 2:
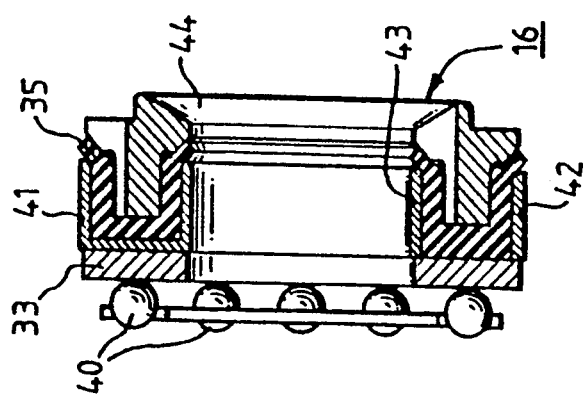
FIG. 2 shows a modified sealing unit of the readjusting device according to FIG. 1.

FIG. 2 Shows a sealing unit 16 modified over FIG. 1. For cost saving purposes, the needle bearing 32 of FIG. 1 has been replaced by a ball bearing 40 as shown in FIG. 2; however, this is advisable only if the increased spot-type pressure exerted by the balls can be withstood by the material selected for the nut. To increase the slidability of the sealing unit 16, the sleeve sealant 31 has been surrounded by a one-piece sliding ring 41 as shown in FIG. 2, top. However, the one-piece sliding ring also may be replaced by two sliding rings 42,43 as shown in FIG. 2, bottom. The slidability of the sealing unit 16 can be substantially increased by such rings. An improved sealant and an improved force transmission of the second spring 36 to the ball bearing 40 is attainable by a centered sleeve 44 supporting, in suitable manner, the sealing lips 35.

Figure 3:
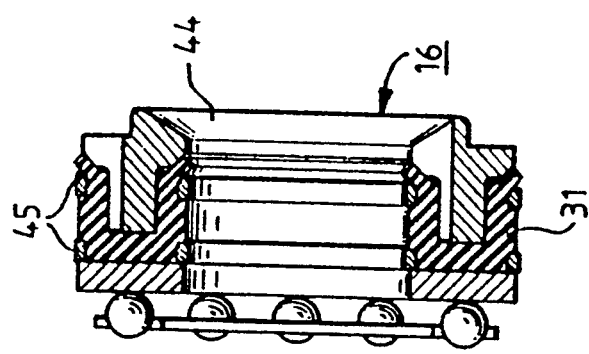
FIG. 3 shows a sealing unit modified over FIG. 2.

FIG. 3 shows another sealing unit modified over the one according to FIG. 1, in which the one-piece or two-piece sliding ring of FIG. 2 is replaced by two narrow sliding rings 45. Otherwise, the sealing unit 16 according to FIG. 3 is identical with the one according to FIG. 2. The sliding ring or rings may be omitted on the inner or outer sealing face of the sleeve sealant 31. The sliding rings 45 may be buttoned into corresponding recesses of the sleeve sealant 31.

Figure 4:
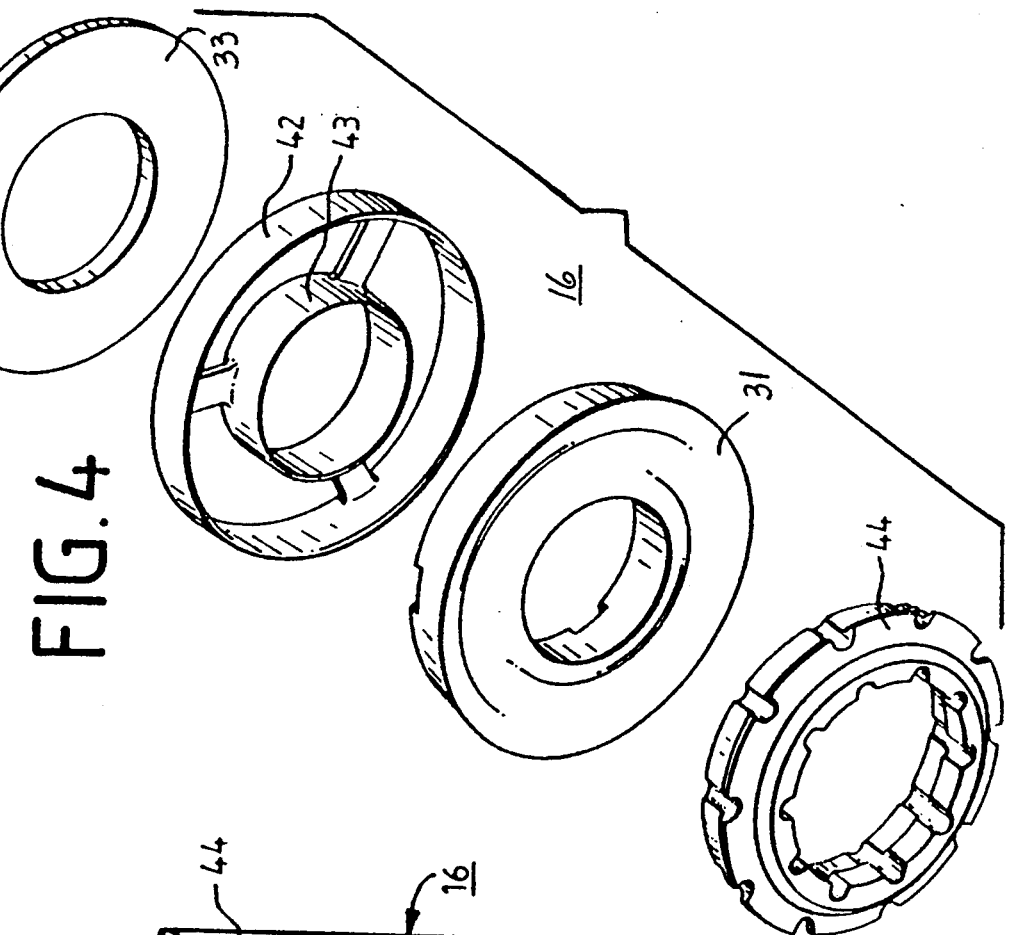
FIG. 4 is an exploded view of individual elements of the sealing unit according to FIG. 2.

FIG. 4 shows, in an exploded illustration, a sealing unit 16 substantially corresponding to the one shown in FIG. 2, wherein the two sliding rings 42, 43 are interconnected through webs. The rest of the components shown in FIG. 4 correspond to the parts shown in FIG. 2 under the same reference numeral.

FIGS. 5 to 12 refer, in sectional side views and in plan views, to various modifications of the non-rotatable, axially displaceable mounting of the spindle 14. As opposed to the spindle 14 according to FIG. 1, the spindle 14 of FIG. 5 comprises two, oppositely arranged, substantially semi-circular, radially extending lugs 17 protruding into corresponding locking grooves 18 (shown in FIG. 1) and insuring non-rotatability and axial displaceability. FIGS. 7 and 8 show a mounting socket 46 for mounting the spindle 14, with the mounting socket 46 in the housing and the spindle 14 being locked against rotation by four lugs oppositely arranged in pairs over the mounting socket 46. A locking groove permits the spring cup 21 according to FIG. 1 to be locked into the mounting socket 46. The first spring 22 is supported on a support plate 48. The unit composed of spring cup 21, first spring 22, mounting socket 46, spindle 17, and support plate 48 may be premounted and inserted as a unit into the cylinder 8 according to FIG. 1.

Figure 10:
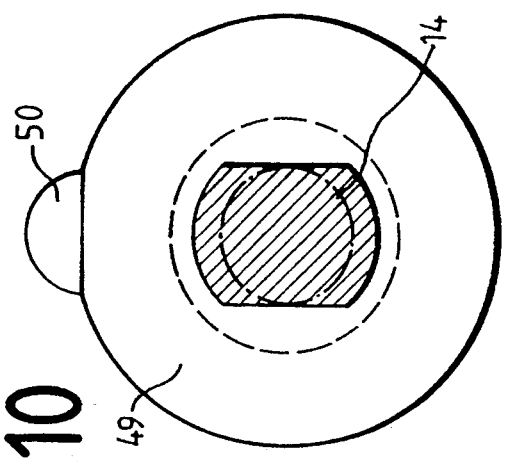
FIGS. 9 and 10 show a readjusting spindle along with a locking plate for locking against twisting.
Figure 12:
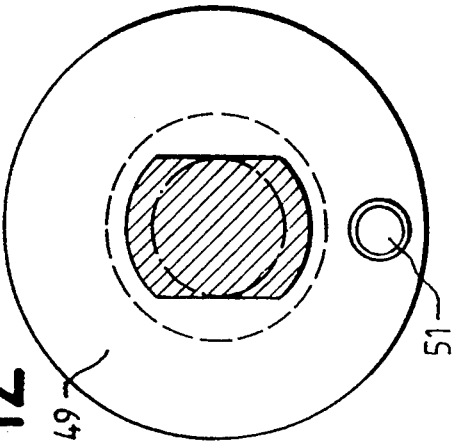
FIGS. 11 and 12 show a readjusting spindle along with a locking plate and a locking bolt for locking against twisting.
Figure 9:
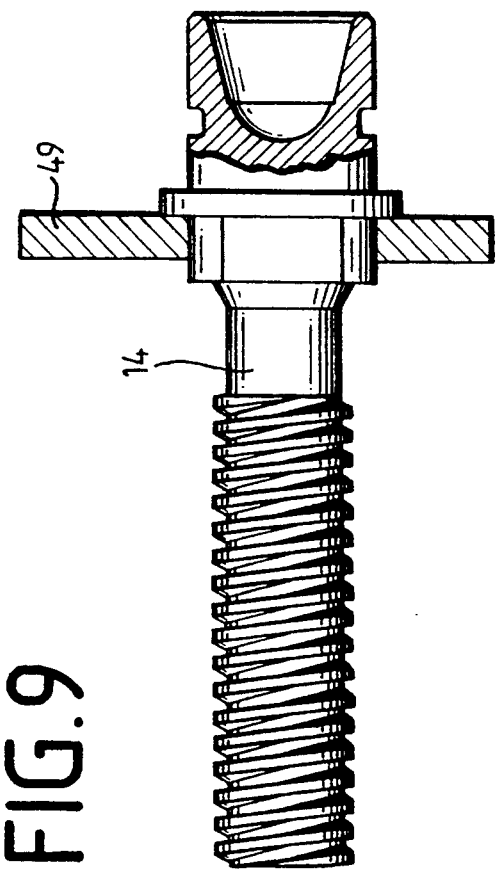
Figure 11:
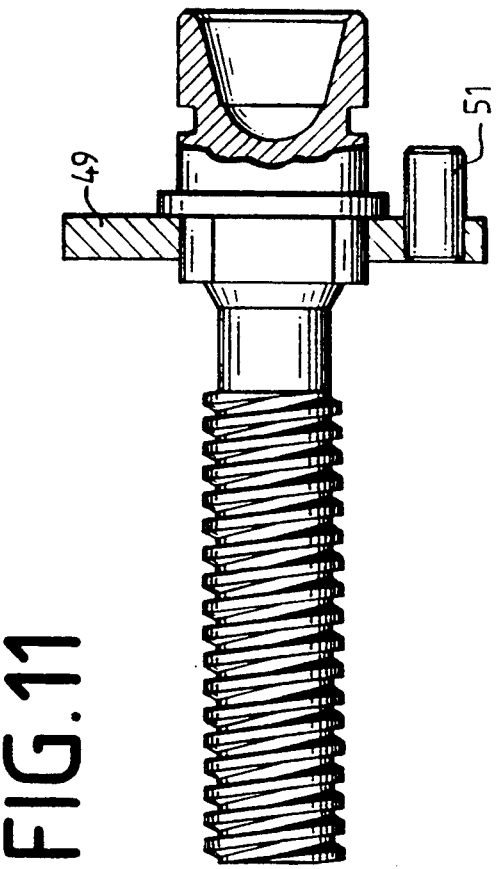

FIGS. 9 and 10 show the spindle 14 locked against rotation and axially displaceable by a retaining plate 49. The edges of the spindle 14 protrude through a hole within the retaining plate 49 such that the spindle cannot rotate in those holes with respect to the retaining plate. The retaining plate 49 can be prevented from rotating with respect to the brake housing (FIG. 1) by providing, for example, a nose 50 (corresponding to lugs 17 in FIGS. 5 through 8) or a retaining pin 51 penetrating through a corresponding bore within the retaining plate 49 and protruding into a corresponding bore extending parallel to the cylindrical longitudinal axis within the lug of cylinder 8.

Figure 13:
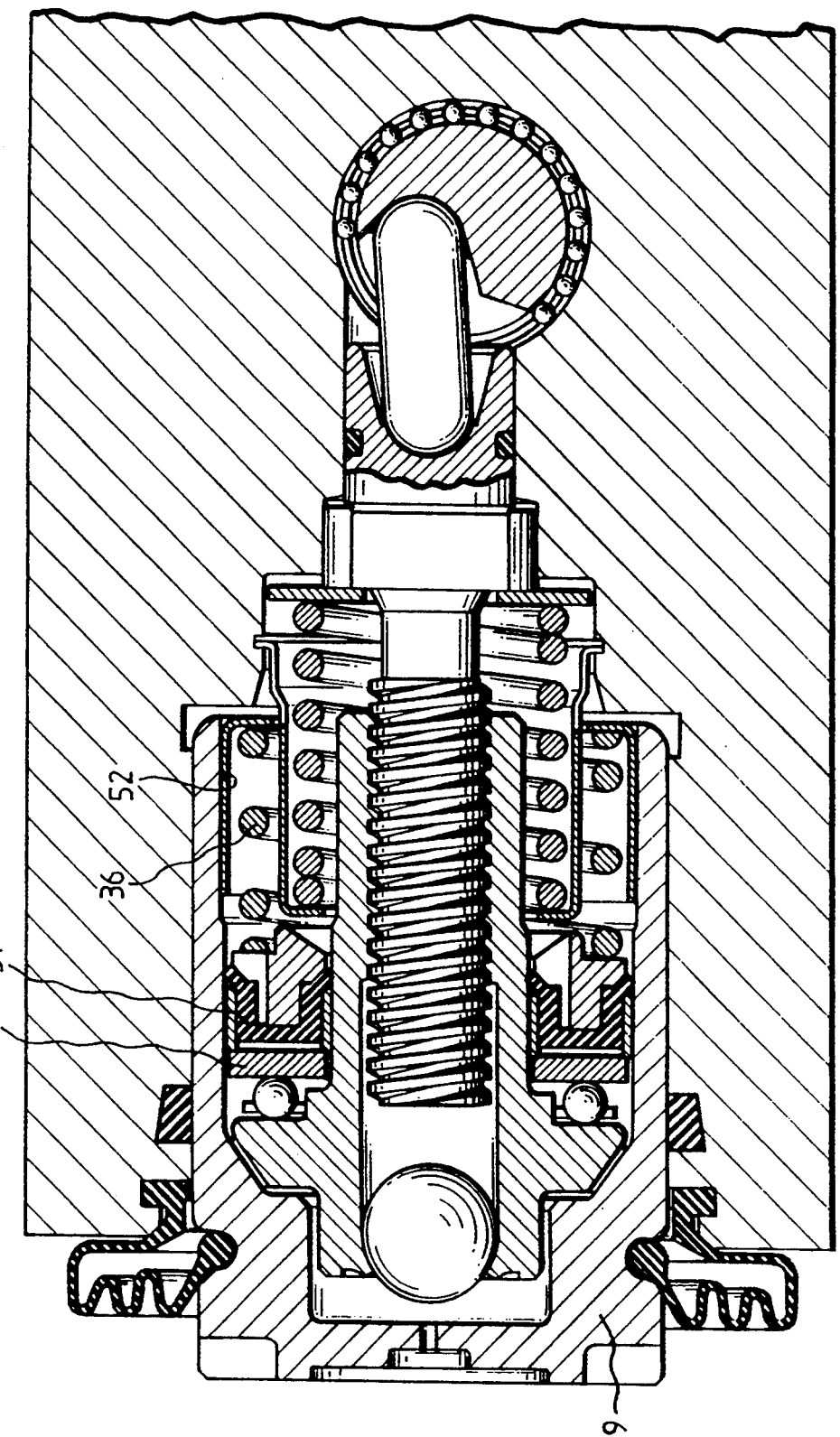
FIG. 13 shows a second embodiment of a readjusting device modified over FIG. 1.

FIG. 13 shows a second embodiment of the readjusting device according to the present invention modified over FIG. 1. Some of the modifications described above have been incorporated. An additional modification exchanges the retaining groove 37 according to FIG. 1 by a piston sleeve 52. Piston sleeve 52 serves as a lock in case the brake movement of the piston 9 is impeded by the second spring 36 because, in that case, given a predetermined force, the piston sleeve 52 will be forced out of the piston. The configuration of the sliding rings substantially corresponds to the one according to FIG. 2 (bottom), with the bottom of the sleeve sealant 31 not mounted on the support disc 33 but rather on webs (not shown) according to FIG. 4.

Figure 14:
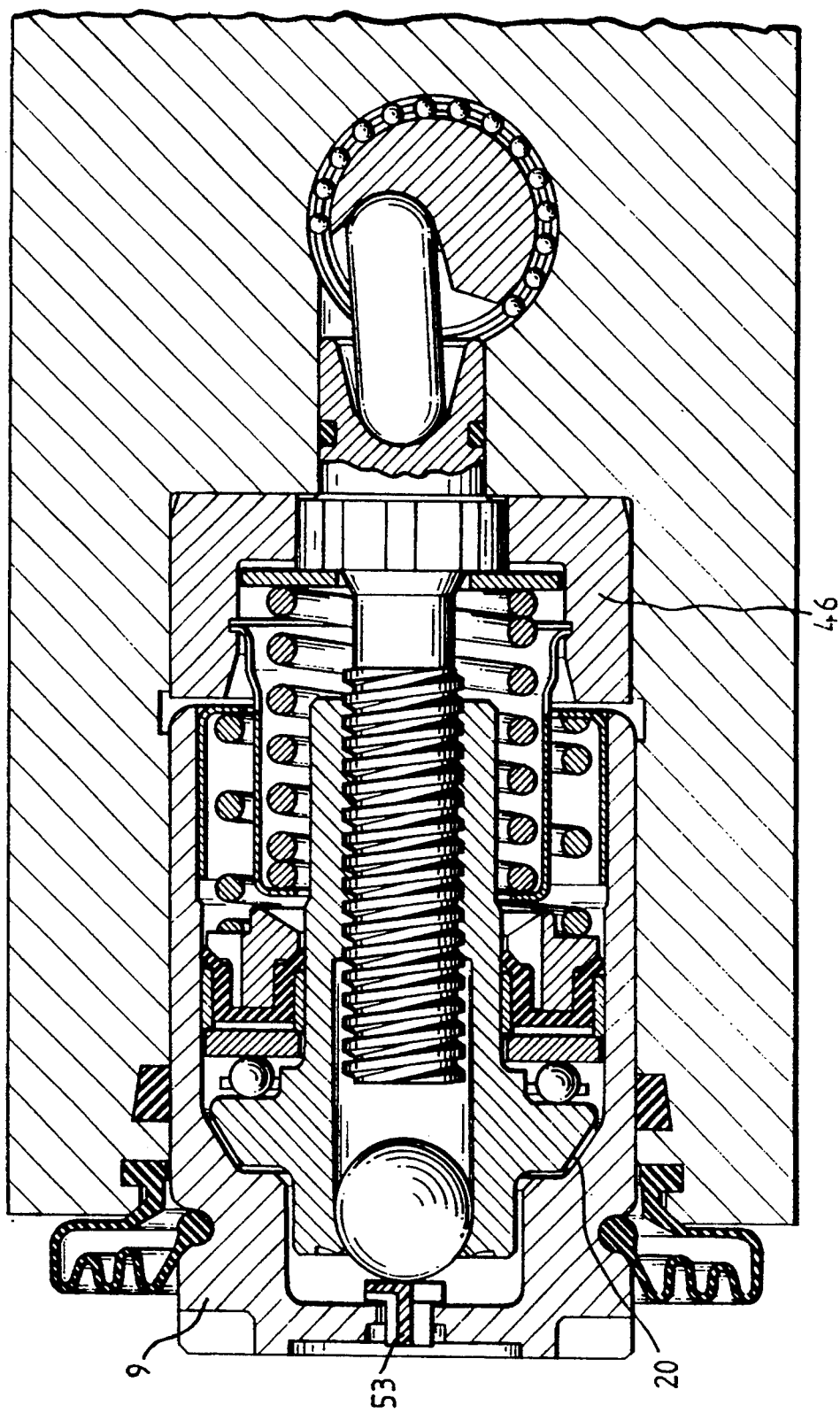
FIG. 14 shows a modified form of the second embodiment of a readjusting device according to FIG. 13 with a spindle support modified according to FIGS. 7 and 8 being inserted.

FIG. 14 shows a modification corresponding to the features described in connection with FIGS. 7 and 8, with the mounting socket 46 given a slightly more solid configuration. FIG. 14, moreover, shows a plug 53. If the plug, in FIG. 14, is pressed to the right, the friction cone 20 can be detached, thereby enabling the piston 9, in the event of repair requirements (such as replacement of pads), to be inserted to the right into the cylinder. The plug 53 is disposed, with play, within a corresponding hole on the bottom of the piston 9, thereby avoiding the hole 26 shown in FIG. 1.

Figure 15:
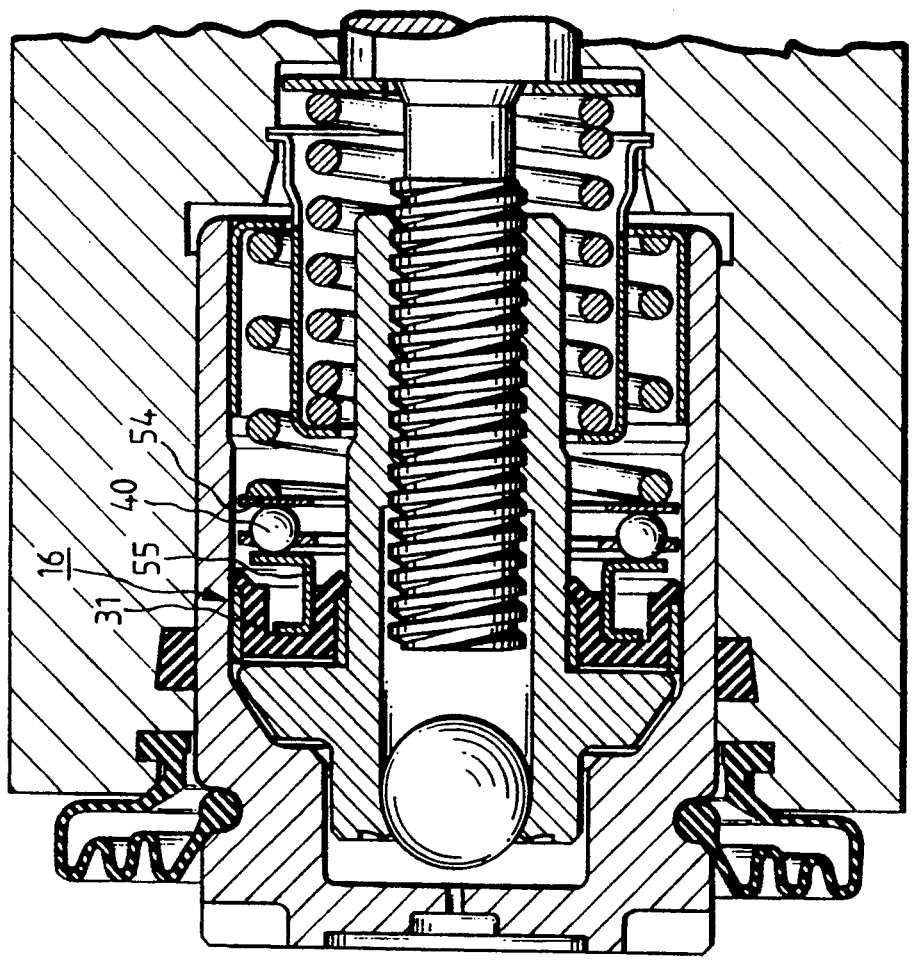
FIG. 15 shows a modified readjusting device according to FIG. 13 with a modified sealing unit.

FIG. 15, as distinguished from FIG. 13, shows a modified embodiment of the sealing unit 16. The parts of the actuator left unchanged over FIG. 13 have, therefore, been omitted in FIG. 15 (righthand side of FIG. 13).

The anti-friction bearing 40 is disposed between a racer 54 and a support ring 55 so that the anti-friction members of the anti-friction bearing 40 contact a material of suitable hardness. The support ring maintains the racing surface for the anti-friction bearing 40 at an adequate distance from the bottom of the sleeve sealant 31.

Figure 16:
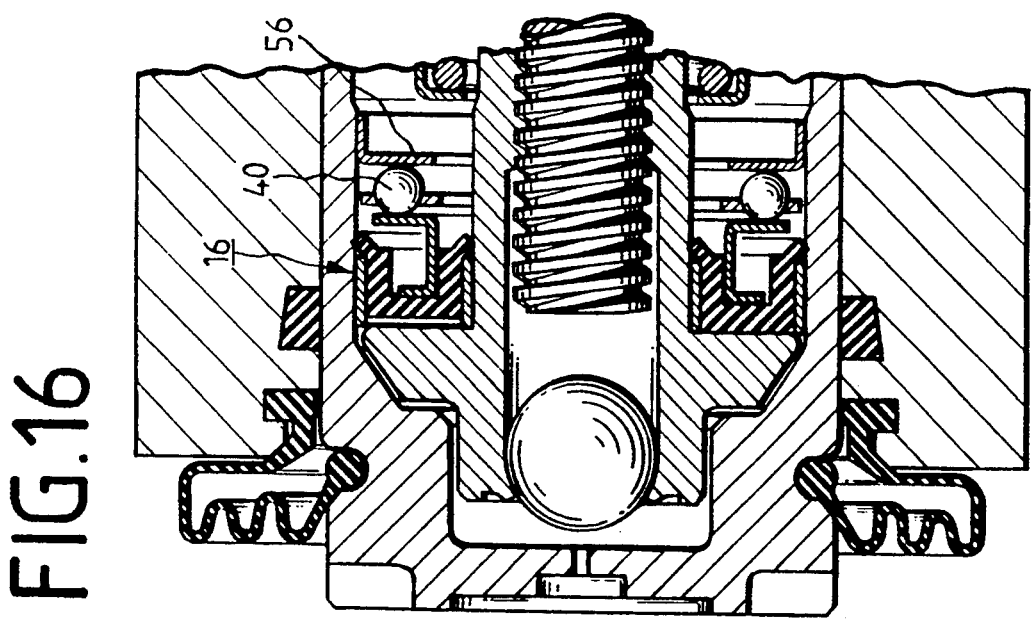
FIG. 16 shows a readjusting device with a sealing unit modified over FIG. 3.

FIG. 16 shows an embodiment of the readjusting device according to the present invention which is not provided with a second spring 36. The support member 56 performs the function of the second spring, acting as an anti-friction bearing according to FIG. 1. The operation 29 of the readjusting device has been adequately described above. Other forms of the embodiment of the sealing unit 16 deviating from FIG. 16 will, of course, be possible without departing from the spirit of the invention. An anti-friction bearing 40, according to FIG. 16, contacts a support member 56. However, the sealing unit 16 also can be designed in accordance with FIG. 1.

Figure 17:
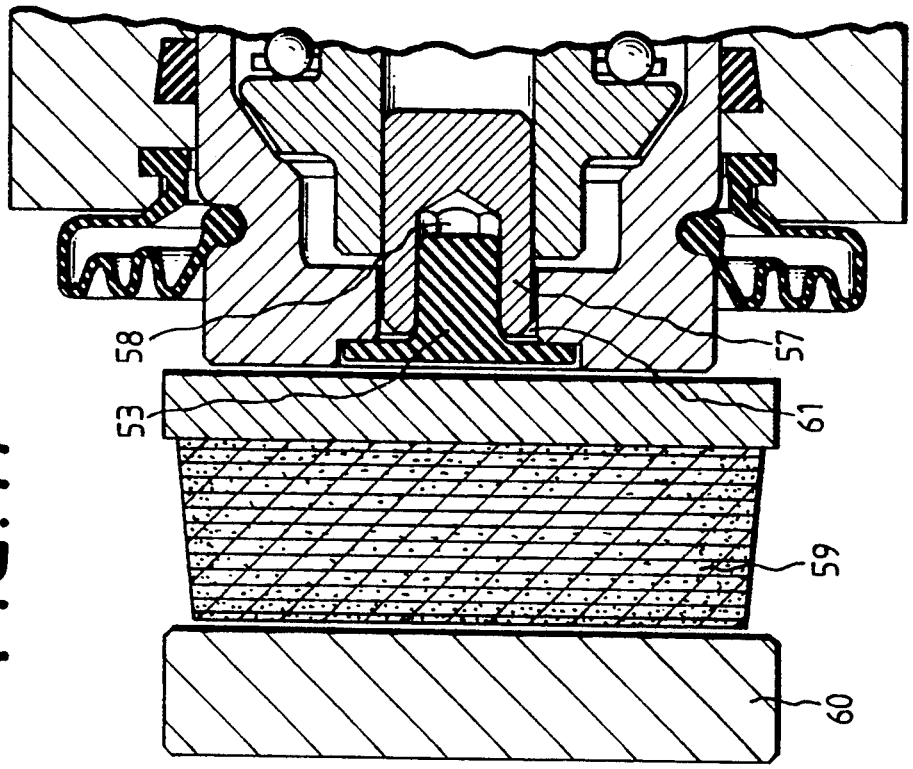
FIG. 17 shows a modified sealing for the readjusting nut and a readjusting nut modified over FIG. 17.

The deviations from FIG. 1, as shown in FIG. 17 replace the sealing ball 30 with a substantially cylindrical closure member 57. A recess 58 is provided in closure member 57 to accommodate a tool, thereby enabling, for example, with the aid of a hexagonal spanner, the nut both to be forced away from the friction cone and to be screwed, according to FIG. 17, to the right by a rotating movement on the spindle, thereby detaching the readjusting device and enabling the piston to be easily inserted. The recess 58 is provided with a plug 53 sealing the recess 58 and protecting the recess against the ingress of dirt.

FIG. 17, in addition, shows the brake shoe 59 actuated by the piston along with a section of the brake disc 60 which is acted upon by the brake shoe 59. If, according to FIG. 17, the chamber 25 of FIG. 1 is under ambient pressure, the closure member 57 is required to protrude, with corresponding play, through the continuous front hole 61 within the piston.

Figure 18:
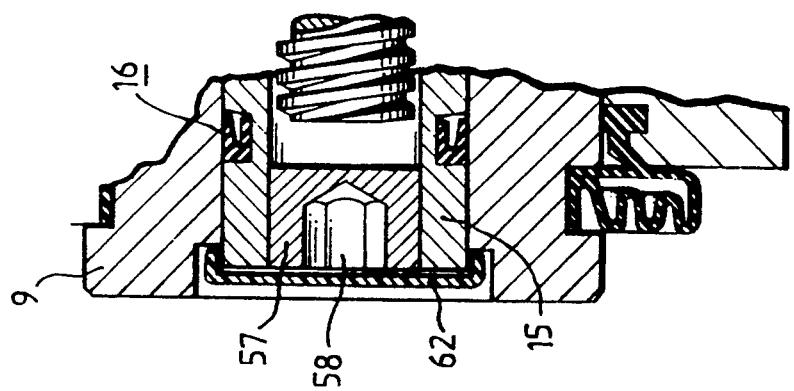
FIG. 18 shows a modification of the closure member.

FIG. 18 shows a modification of the closure member 57 which, however, also is provided with a recess 58 for the accommodation of a tool. A lid 62 protects the piston interior against the ingress of dirt. The lid is detachable so that the closure member 57 can be screwed, through the recess 58, to the right. Also, it will, of course, be possible for the closure member 57 to be integrally formed with the nut 15.

To improve slidability, the sealing unit may have sliding rings made of highly slidable and flexible Teflon. The exchange of the nut-sided slide rings as described in FIG. 13 with a recess will permit a sealing effect in two pressure stages. First, only the sealing lips will seal at a lower friction resistance, while, at an elevated pressure, the recess 34 is filled by the material of the sleeve sealant, thereby increasing the sealing effect. The centering sleeve 44 is so configured that—while easily vented—it transmits the spring force through the rubber diaphragm to the support ring and, hence, to the axial bearing and the friction cone. At elevated hydraulic pressures, the expanding sleeve forces the Teflon rings against the sealing faces, thus enhancing the sealing effect of the resilient lips (two-phase sealing), thereby increasing, in a side effect, the friction forces and increasingly preventing the nut from rotating.

In addition, the position of the sealing unit 16, axially, is remote from the hot brake disc to such an extent that the temperature problem, which is likely to arise with prior art readjusting devices, is avoided. The plug 53 enables the piston to be set back for replacing the pad, without rotation of the piston, especially if the thread 29 is a trapezoidal thread. The second spring 36, at the same time, forms a stop for the movement of the piston 9, thereby limiting the possible movement of the piston. This is of advantage, for example, in misassemblies (inadvertent omission of the brake pad) or in the first hydraulic movement, because, in that instance, the piston tries to cover a distance which can exceed the aggregate of the normal actuating distance inclusive of the normal brake pad wear. This internal stop will insure that the spindle cannot move out to a further degree than is permitted by the spindle sealant (O-ring 38). The brake, hence, also in cases of faulty operations or misassemblies, will remain pressure-tight. As the axial movement of the spindle is confined by this stop, a high piston force results from the hydraulic pressure.

In addition to the retaining groove 37 as described above, another locking element is provided, namely the piston sleeve 52. The length of piston sleeve 52 is dimensioned so that, in view of the piston force, the spring sleeve in the piston can slide a distance approximately equal to the thickness of the brake pad. The piston sleeve does not lose its guidance and, upon insertion of the piston into the housing, the piston sleeve can be brought flush against the piston, thereby enabling the brake to retain its full serviceability.

The support member 56 according to FIG. 16 not only can cause an internally directed resilient effect but also may be provided with play vis-à-vis the ball bearing 40. The minimum gap permits easy opening of the friction cone and enables readjustment in accordance with the above descriptions.

The lid 62 is forced at a space from the piston 9 onto the nut 15, thereby permitting an adequate axial movement of the nut 15. An improvement allowing a greater freedom of movement of the nut 15 is attained if the outer annular cylindrical surface of the lid 62 is pressed onto the annular inner wall of the recess of the piston 9 accommodating the lid 62.

We claim:

1. A readjusting device for a vehicle brake having a longitudinal axis and including hydraulic actuating means creating pressure upon actuation of said brake; mechanical actuating means; a cylinder; a hollow piston displaceably disposed in said cylinder and actuated by said hydraulic actuating means and by said mechanical actuating means; said readjusting device comprising:

a longitudinally displaceable, non-rotatable spindle disposed between said piston and said mechanical actuating means, activated by said mechanical actuating means, and having a thread;

a longitudinally displaceable, rotatable nut in threaded, non-self locking engagement with said spindle and positioned within said piston;

a friction cone formed upon engagement between said nut and said piston and adapted to prevent rotation of said nut;

a sealant disposed between said piston and said nut and adapted to react to application of said pressure applied upon actuation of said brake to displace said nut toward said piston; and a first spring biasing said nut toward said mechanical actuating means and away from said piston to, upon release of said brake, cause rotation of said nut relative to said spindle, said pressure applied upon actuation of said brake overcoming said bias when said pressure exceeds a predetermined value and preventing readjustment of said brake.

2. A readjusting device as claimed in claim 1 further comprising a second spring having a first end supported on said piston and a second end acting upon said nut, said second spring forcing said nut toward said piston to form said friction cone.

3. A readjusting device as claimed in claim 2 wherein said sealant is a sleeve sealant and said second spring acts upon said nut through said sleeve sealant.

4. A readjusting device as claimed in claim 1 wherein said piston has a closed end and an open end, said closed piston end and said sealant forming an ambient pressure chamber communicating with the atmosphere through a hole within said piston.

5. A readjusting device as claimed in claim 1 further comprising a roller bearing located between said sealant, which is supported on said piston, and said nut, said roller bearing facilitating rotation of said nut with respect to said piston.

6. A readjusting device as claimed in claim 5 further comprising a support disc provided between said roller bearing and said sealant, said roller bearing configured as one of a ball bearing and a needle bearing.

7. A readjusting device as claimed in claim 2 wherein the surface of said piston has a retaining groove and said first end of said second spring is locked in said retaining groove.

8. A readjusting device as claimed in claim 1 wherein said piston has a closed end and said nut has an internal thread and a conical lug facing said closed end of said piston and forming said friction cone.

9. A readjusting device as claimed in claim 8 wherein said nut has a continuous, longitudinal orifice and said internal thread is molded into said orifice.

10. A readjusting device as claimed in claim 9 further comprising a ball and wherein said orifice of said nut has a first end facing said closed end of said piston, said ball forming a pressure-tight seal of said first end of said orifice.

11. A readjusting device as claimed in claim 4 further comprising a protective sleeve mounted within an annular groove in the surface of said piston, said annular groove connected with said hole within said piston by a bore extending in a direction oblique to the longitudinal axis.

12. A readjusting device as claimed in claim 1 further comprising a spring cup, said first spring supported on said cylinder by said spring cup.

13. A readjusting device as claimed in claim 12 wherein said spring cup has an open end provided with a radially outwardly directed rim and slots extending along the longitudinal axis, said rim and said slots forming locking arms extending in a direction oblique to the longitudinal axis.

14. A readjusting device as claimed in claim 3 further comprising a mounting socket held non-rotatably within said cylinder and wherein said spring cup, said first spring, and said spindle are disposed in said mounting socket to form a pre-mounted unit.

15. A readjusting device as claimed in claim 3 further comprising a centering sleeve between said second spring and said sleeve sealant orienting said sleeve sealant.

16. A readjusting device as claimed in claim 1 wherein said sealant has a top surface and a bottom surface and at least one of said surfaces has means for improved sliding.

17. A readjusting device as claimed in claim 16 wherein said sliding means includes a sliding ring buttoned into said sealant.

18. A readjusting device as claimed in claim 16 wherein said sliding means includes a sliding ring on each of said surfaces of said sealant, said sliding rings interconnected by webs.

19. A readjusting device as claimed in claim 1 wherein said spindle is extruded.

20. A readjusting device as claimed in claim 1 wherein said piston has a front hole disposed along said longitudinal axis and said nut has a recess also disposed along said longitudinal axis, said recess adapted to accommodate a threaded tool and opening into said front hole.

21. A readjusting device as claimed in claim 20 further comprising a closure member and wherein said recess is molded into said closure member, said nut has a continuous, longitudinal orifice, and said closure member seals said orifice of said nut in a pressure-tight manner.

22. A readjusting device as claimed in claim 21 wherein said closure member extends, at least partly, into said front hole of said piston with play.

23. A readjusting device as claimed in claim 22 further comprising a detachable lid closing said front hole of said piston.

24. A readjusting device as claimed in claim 5 further comprising a piston sleeve and wherein said piston has a closed end, an open end, and a hole in which said piston sleeve is positioned, said roller bearing supported toward said open end of said piston by said piston sleeve and said piston sleeve longitudinally displaceable with respect to said piston upon application of a predetermined force.

25. A readjusting device as claimed in claim 24 further comprising a racer and wherein said roller bearing is supported toward said closed end of said piston on said nut and through said racer.

26. A readjusting device as claimed in claim 24 further comprising a support ring and wherein said roller bearing is supported toward said closed end of said piston on said nut and through said support ring and said sealant.

27. A readjusting device as claimed in claim 17 wherein said sealant is supported on said nut through said sliding ring.

* * * * *

UNITED STATES PATENT AND TRADEMARK OFFICE
CERTIFICATE OF CORRECTION

PATENT NO. : 5,443,141
DATED : August 22, 1995
INVENTOR(S) : Thiel et al.

It is certified that error appears in the above-identified patent and that said Letters Patent is hereby corrected as shown below:

In column 13, claim 14, line 56, delete "3" and substitute therefor --13--.

Signed and Sealed this

Ninth Day of January, 1996

Attest:

BRUCE LEHMAN

*Attesting Officer*     Commissioner of Patents and Trademarks